(12) United States Patent
McLaughlin

(10) Patent No.: US 10,876,566 B2
(45) Date of Patent: Dec. 29, 2020

(54) METHOD AND APPARATUS FOR MAINTAINING A RELATIONSHIP BETWEEN SEPARATE OBJECTS

(71) Applicant: James Michael McLaughlin, Homewood, IL (US)

(72) Inventor: James Michael McLaughlin, Homewood, IL (US)

(*) Notice: Subject to any disclaimer, the term of this patent is extended or adjusted under 35 U.S.C. 154(b) by 84 days.

(21) Appl. No.: 16/288,448

(22) Filed: Feb. 28, 2019

(65) Prior Publication Data

US 2020/0277978 A1    Sep. 3, 2020

(51) Int. Cl.
*F16B 23/00* (2006.01)
*F16B 37/08* (2006.01)

(52) U.S. Cl.
CPC .......... *F16B 23/0007* (2013.01); *F16B 37/08* (2013.01); *F16B 2200/10* (2018.08)

(58) Field of Classification Search
CPC ... F16B 23/0007; F16B 37/08; F16B 2200/10
See application file for complete search history.

(56) References Cited

U.S. PATENT DOCUMENTS

| | | | | |
|---|---|---|---|---|
| 3,329,057 A * | 7/1967 | Salz | ..................... | F16B 23/0007 411/366.1 |
| 3,357,094 A * | 12/1967 | Mouck | ................ | F16B 19/1063 29/509 |
| 6,537,004 B2 * | 3/2003 | Cosenza | ................... | F16B 5/02 411/286 |
| 6,547,500 B2 * | 4/2003 | Cosenza | ................... | F16B 5/02 411/34 |
| 6,676,347 B2 * | 1/2004 | Jensen | ...................... | F16B 5/02 411/284 |
| 8,075,233 B2 * | 12/2011 | Hasegawa | ............... | F16B 31/02 411/8 |
| 9,416,525 B2 * | 8/2016 | Johnson | ................. | E03D 11/16 |

* cited by examiner

*Primary Examiner* — Bayan Salone
(74) *Attorney, Agent, or Firm* — Wood, Phillips, Katz, Clark & Mortimer

(57) ABSTRACT

A method of maintaining first and second objects in a desired relationship. The method involves obtaining a fastener having a body with an elongate shank. The body has a head with a blocking surface. The shank is configured to engage a surrounding bore surface on or associated with at least one of the first and second objects to cause the shank to advance axially in a tightening direction while turned in one direction. The fastener body is engaged at a location spaced from the head to turn the shank in the one direction, thereby causing the shank to draw the head so as to move the blocking surface on the head towards a selected holding position relative to one of the first and second objects wherein the fastener is in a fastened state. The invention is also directed to the fastener construction.

20 Claims, 7 Drawing Sheets

METHOD AND APPARATUS FOR MAINTAINING A RELATIONSHIP BETWEEN SEPARATE OBJECTS

BACKGROUND OF THE INVENTION

Field of the Invention

This invention relates to securing structure through which a relationship between separate objects can be maintained.

Background Art

In many different environments, and for many different purposes, objects are required to be maintained in a desired relationship with each other. A very common way of doing so is by using a threaded fastener. Threaded fasteners are commonly in one of two forms.

In a first form, a threaded shank has a pointed leading end and an enlarged head at a trailing end. The shank diameter generally tapers towards the leading end over an axial length. The head is manipulated to turn the shank around its axis to advance or retract the fastener. The threaded shank may be serially advanced into two or more objects. With the fastener in a fastened state, one or more objects become captively maintained between the fastener head and a threaded portion of the shank whereat there is purchase of one or more of the objects.

To allow manipulation of the head, in one form a receptacle for an appropriate tool is provided thereon. The receptacle has an axial depth and is commonly configured to be complementary to conventional screwdriver or wrench fittings. For security purposes, the receptacle may be configured to require a customized tool whereby the ability to turn the fastener may be limited to those in possession of the customized tool. Alternatively, the head may have a peripheral surface with a shape to accommodate a conventional wrench or a customized tool that, again, affords a security feature by limiting turning to those who have access to the customized tool.

A second form of threaded fastener is a basic bolt and nut arrangement. The bolt portion is similar to the aforementioned screw in that it has a threaded shank and a head at its trailing end that allows turning of the shank. However, the shank need not be pointed at its leading end and the thread diameter may be relatively constant, as opposed to the shank on the aforementioned screw arrangement, which generally has a varying diameter to facilitate boring.

The nut that cooperates with the bolt has potentially a number of different forms. Once the nut is threaded onto the bolt shank, axially facing surfaces on the head and nut create a capture region which is variable in axial dimension by relatively turning the bolt and nut around the bolt axis.

The nut may be initially unattached to an object or pre-fixed to an object either at an exposed surface thereon or partially or fully recessed into an object. The bolt head, as with the aforementioned screw head, might project from the surface of the object that it engages, or be drawn partially or fully into a recess therein. This recess may be pre-formed or formed under pressure as the fastener is tightened.

The particular configuration of fastener is dictated by the particular application. Generally, there are two controlling guidelines that dictate design.

It is a common design objective to limit the projection of one or both ends of the fastener from associated objects. This avoids the creation of an obstruction that might snag objects or limbs or clothing on individuals sliding thereagainst.

To have a flush relationship between the head and one of the objects, a recessed arrangement can be provided. However, recessing necessitates the formation of a tool receptacle therein which weakens the head, may create a sharp edge configuration that might snag contacting persons and/or objects, and creates a configuration that may allow loosening of the fastener. In environments where security is critical, any receptacle, even if designed for a special tool, offers an opportunity for a creative thief to improvise a structure to engage and effect turning of the head.

Consequently, all currently known fasteners have limitations in terms of their ability to be flushly mounted at both ends and/or to be effectively resistant to tampering.

SUMMARY OF THE INVENTION

In one form, the invention is directed to a method of maintaining first and second objects in a desired relationship. The method includes the step of obtaining a fastener having a body with an elongate shank with a central axis and a length extending in an axial direction between a leading end and a trailing end of the body. The body has a head defining a blocking surface facing generally in a leading direction. The shank is configured to engage a surrounding bore surface on or associated with at least one of the first and second objects to cause the shank to advance axially in a tightening direction, with the head in a trailing direction, as an incident of the shank being turned around the central axis in one direction. The method further includes the steps of engaging the fastener body at a location spaced from the head, and at the engaging location, imparting a force to turn the shank around the central axis in the one direction. As an incident of turning the shank around the central axis in the one direction, the shank draws the head so as to urge the blocking surface on the head towards a selected holding position relative to one of the first and second objects, wherein the fastener is in a fastened state.

In one form, the bore surface is at least one of formed in or enlarged as an incident of the shank advancing axially in the tightening direction.

In one form, the fastener has a discrete component on at least one of the first and second objects that defines the surrounding bore surface.

In one form, the shank and surrounding bore surface are complementarily threaded.

In one form, the discrete component has a blocking surface that faces generally oppositely to the blocking surface on the head. The blocking surfaces defines a capturing region therebetween that is variable by effecting relative movement between the shank and discrete component around the central axis.

In one form, the head has a surface facing oppositely to the blocking surface. With the fastener in the fastened state, the oppositely facing surface on the head is substantially flush with a surface through which the fastener extends on one of the first and second objects.

In one form, the oppositely facing surface is smooth and uninterrupted over an entire area of the oppositely facing surface.

In one form, the leading end has a receptacle to make a keyed connection with a part of a turning tool through which the shank can be turned around the central axis.

In one form, the fastener is provided in combination with a turning tool with a part to make keyed connection with the leading end receptacle.

In one form, with the first and second objects in an operative relationship, the first and second objects respectively define oppositely facing first and second surfaces, With the fastener in the fastened state, the head does not project significantly from the first surface and the discrete component does not project significantly from the second surface.

In one form, the receptacle is defined by a surface that extends continuously around the central axis.

In one form, the surface has a polygonal shape as viewed along the central axis.

In one form, the receptacle is bounded by a surface that faces circumferentially oppositely to the one direction.

In one form, the first and second objects in the desired relationship are fixed relative to each other.

In one form, the first and second objects are drawn towards each other as the fastener is changed into the fastened state.

In one form, there is at least a third object between the first and second objects.

In one form, the invention is directed to the fastener as described above.

In one form, the leading end of the fastener has a receptacle to make keyed connection with a part of a turning tool through which the shank can be turned around the central axis.

In one form, the fastener is provided in combination with the turning tool.

DETAILED DESCRIPTION OF THE PREFERRED EMBODIMENT

Figure 1:
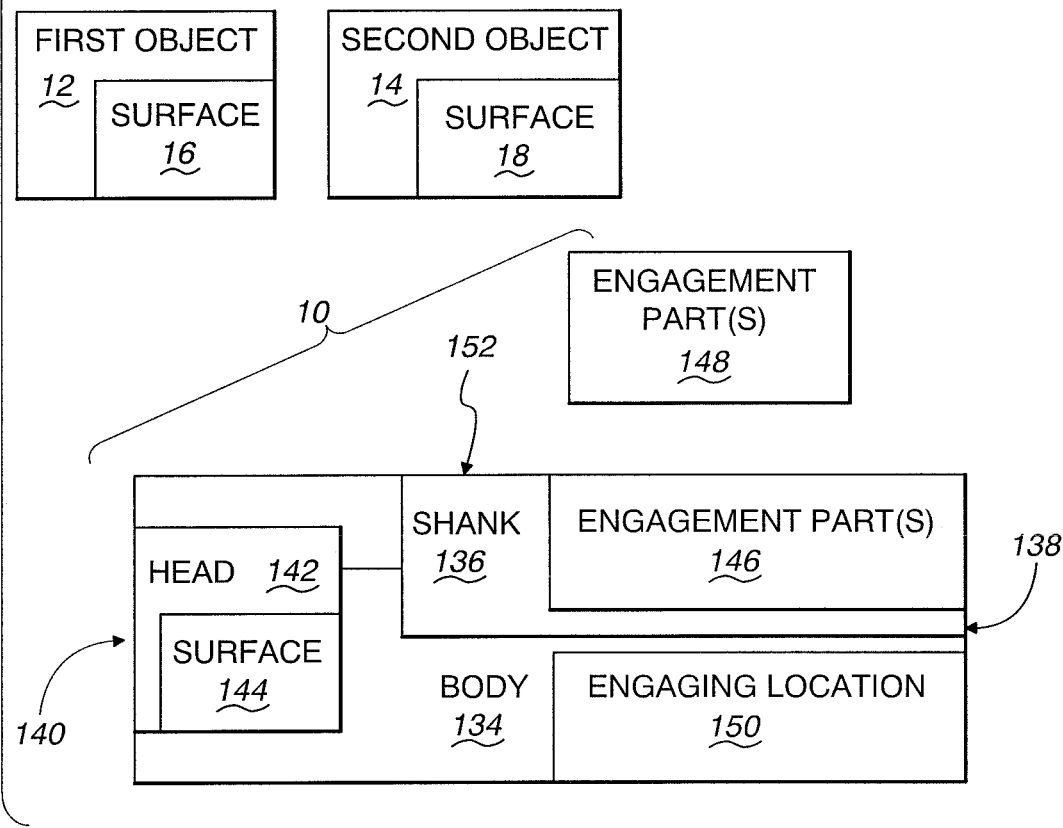
FIG. 1 is a schematic representation of a fastener, according to the invention, for maintaining first and second objects in a desired relationship.

The present invention is directed to a fastener, shown schematically at 10 in FIG. 1, as used to maintain at least first and second objects, also shown in schematic form in FIG. 1 respectively at 12 and 14, in a desired relationship. Before getting into the details of the generically depicted fastener 10 in FIG. 1, various forms of conventional fastener, into which the present invention can be incorporated and/or over which the present invention improves, will be described with respect to FIGS. 2-14.

Figure 15:
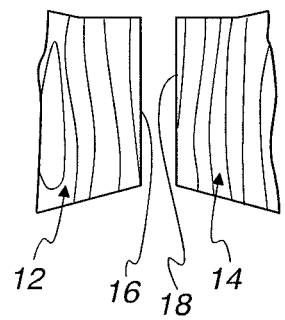
FIG. 15 is a fragmentary, side view showing parts of two objects in a desired relationship with each other.
Figure 16:
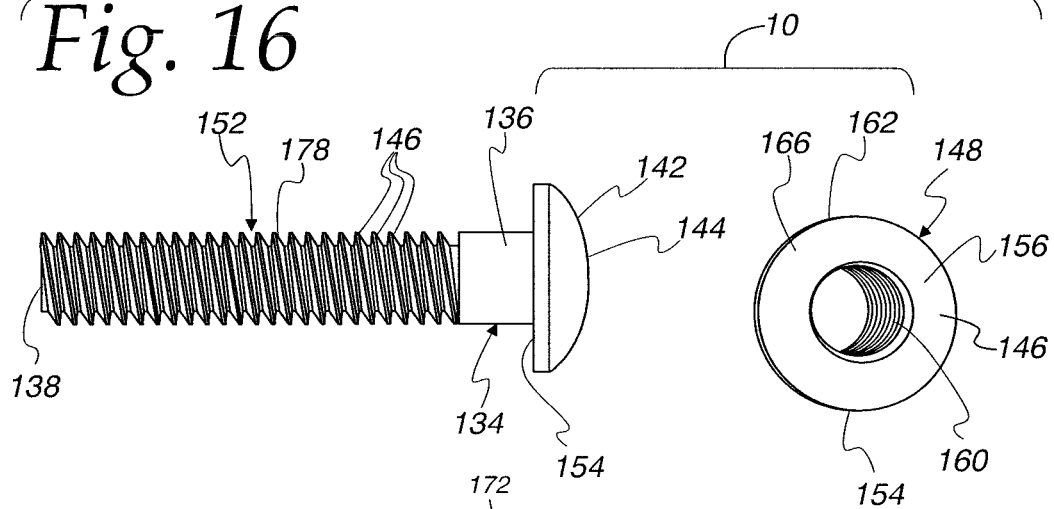
FIG. 16 is a perspective view of a nut and bolt, according to the present invention, in a separated relationship.
Figure 17:
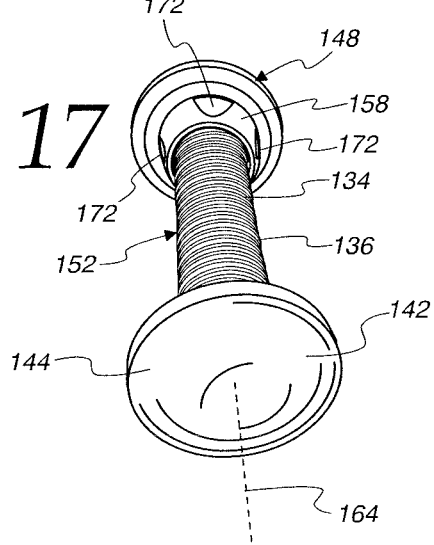
FIG. 17 is a perspective view of the nut and bolt in FIG. 16 connected together.

In all Figures, the first and second objects 12, 14 are shown in a schematic form since the particular details thereof are not important. The objects 12, 14 may one or both be small pieces or large components requiring several fasteners to maintain a desired relationship. It suffices to say that the objects 12, 14 could be made of any material and have any form, shape, construction, etc., with the only significant aspect being that the selected fastener or fasteners maintain a desired relationship therebetween. This relationship may be a fixed relationship, with surfaces 16, 18, respectively on the first and second objects 12, 14, either against each other or spaced from each other, as shown in FIG. 15. Alternatively, the maintained relationship may be one wherein the objects 12, 14 can move away from each other only a controlled distance.

Figure 2:
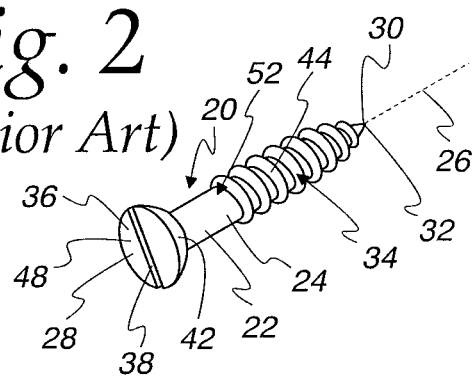
FIG. 2 is a perspective view of a conventional screw fastener of the type into which the present invention can be incorporated.
Figure 3:
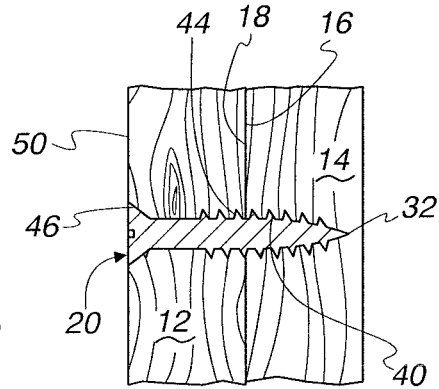
FIGS. 3 and 4 are fragmentary views showing the fastener in FIG. 2 extended into first and second objects to maintain a desired relationship therebetween.
Figure 4:
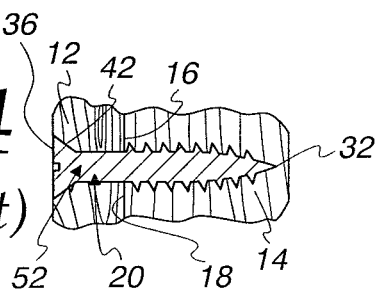

As seen in FIGS. 2-4, a fastener 20 is in the form of a screw with a body 22 consisting of a shank 24 with a central axis 26. The body 22 has axially spaced ends 28, 30. The end 30 tapers to a sharp tip 32.

The body 22 has threads 34 that taper towards the end 30, which is the leading end of the body 22. The trailing body end 28 has an enlarged head 36 with a fitting 38 formed therein to accommodate a conventional slotted screwdriver tip.

The tapered thread arrangement allows the fastener 20 to bore through softer materials, such as wood, a composite, etc., making up one or both of the objects 12, 14. A pilot bore may be formed in the objects 12, 14 or the fastener 20 may be pressed as it is turned around the axis 26 to advance the fastener 20 through the objects 12, 14, whereby it forms, rather than progressively enlarges, a bore 40 through the objects 12, 14.

As the fastener 20 is turned around its axis 26 in a tightening direction, the threads 34 progressively purchase the material on the objects 12, 14 around the bore 40. With the fastener 20 fully tightened, a captive arrangement is created between a generally axially facing surface 42 on the head 36 and generally axially oppositely facing curved surfaces 44 on each thread turn.

In this embodiment, the bore 40 has a countersunk end 46 that may be either preformed or formed under the pressure of the advancing fastener 20. This allows a flush, or near flush, relationship between a head surface 48 and a surface 50 on the object 12 through which the leading end of the fastener 20 is first directed.

With the shank 24 having an unthreaded portion at 52 downstream of the head 36 with an axial length at least equal to the penetrated distance of the first object 12, the unthreaded portion 52 can turn within the first object 12 with the head 36 fully seated, whereupon further turning of the fastener 20 in the tightening direction draws the surface 18 of the object 14 towards the surface 16 of the object 12.

The fastener 20 can be used without a countersinking arrangement or alternatively a slight countersinking can occur by reason of the pressure of tightening which draws the head 36 axially against the object 12.

Figure 5:
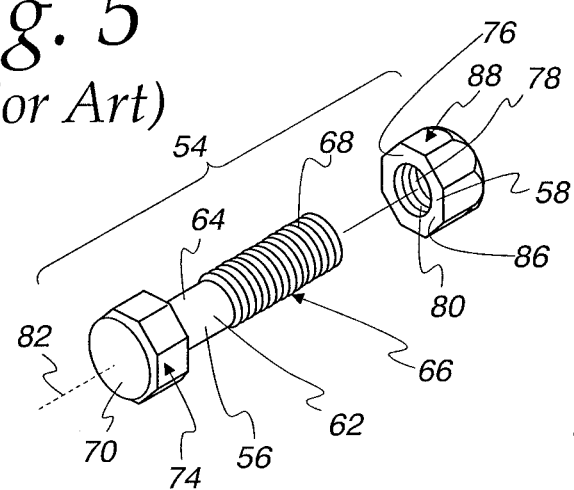
FIG. 5 is an exploded perspective view of another type of conventional fastener in the form of a bolt and nut.
Figure 6:
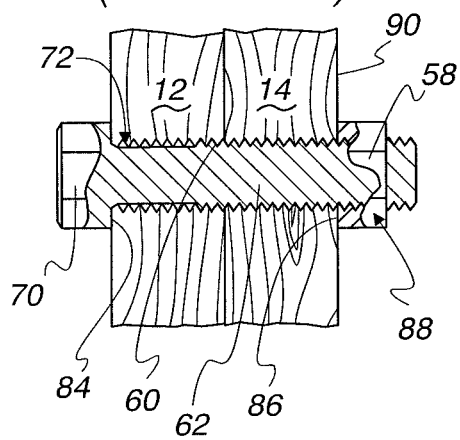
FIG. 6 is a fragmentary, cross-sectional view showing the nut and bolt in FIG. 5 in a fastened state to maintain first and second objects in a desired relationship.
Figure 7:
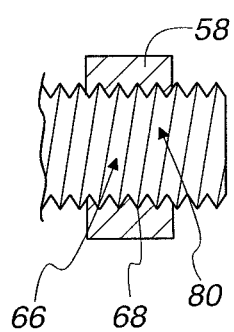
FIG. 7 is an enlarged, fragmentary, cross-sectional view showing cooperating threads on the nut and bolt in FIGS. 5 and 6.

In FIGS. 5-7, a conventional fastener 54 is shown in the form of a bolt 56 and a cooperating nut 58.

Typically, a bore 60 will be preformed through the first and second objects 12, 14 to accommodate the bolt 56.

The bolt 56 has a body 62 with a shank 64 having threads 66 with individual turns 68 having generally a constant diameter over the axial extent of the threaded portion.

An enlarged head 70 is provided at the trailing end 72 of the body 62. The head 70 has a polygonally-shaped circumferential surface 74 to be engaged for turning by a conventional wrench.

The nut 58 has a body 76 with a threaded through bore 78. Threads 80 on the nut 58, complementary to the threads 66 on the bolt 56, cooperate with the bolt threads 66 so that as the bolt 56 is turned around a lengthwise axis 82 of the body 62 relative to the nut 58, the axial spacing between the bolt head 70 and nut 58 varies, either increasing or decreasing depending upon the direction of turning. The tightened fastener 54 thus produces a variable length capturing region between an axially facing surface 84 on the bolt head 70 and an axially oppositely facing surface 86 on the nut 58. The nut 58 has a polygonally-shaped circumferential surface 88 which allows it to be engaged by a conventional wrench to facilitate tightening of the fastener 54.

Figure 8:
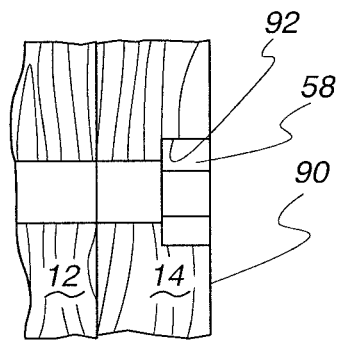
FIG. 8 is a view of the objects as in FIG. 6 wherein the nut is recessed within one of the objects.
Figure 9:
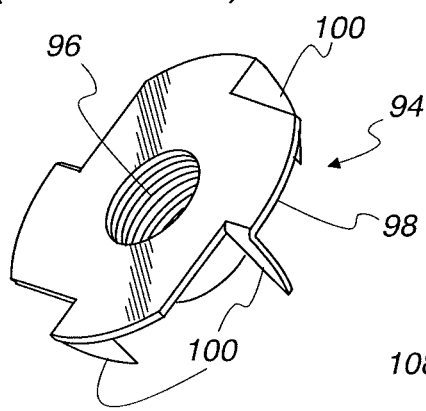
FIG. 9 is an end elevation view of an alternative form of conventional nut.
Figure 10:
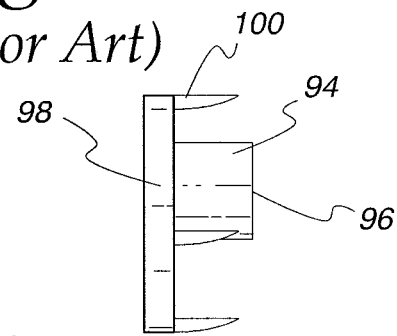
FIG. 10 is a side elevation view of the nut in FIG. 9.

The fastener 54 is shown in FIGS. 5-7 with the surface 86 of the nut 58 borne against an exposed surface 90 of the object 14. As shown in FIG. 8, the nut 58 might alternatively be fit in a recess/undercut 92 so that its projection beyond the object surface 90 is reduced or altogether eliminated with a flush or more fully recessed arrangement. The recess 92 may be formed to key the bolt 58 against turning around the axis 82 as the fastener 54 is tightened.

There is a multitude of different types of nut arrangements that might be used. As one example, in FIGS. 9 and 10, a prong tee nut 94 is shown. The nut 94 has a threaded body 96 with a flat flange 98 from which prongs 100 are struck. With this arrangement, the nut body 96 can be pressed into a preformed bore whereupon the prongs 100 penetrate the object to prevent turning thereof.

Figure 11:
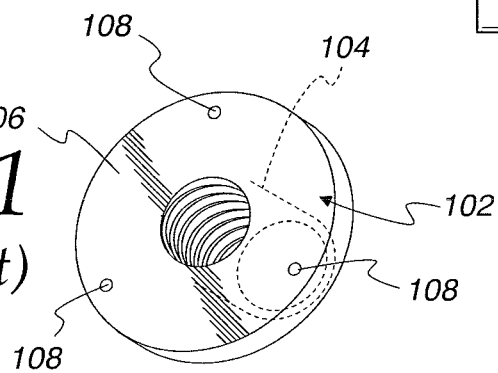
FIG. 11 is an end elevation view of another form of conventional nut.

In FIG. 11 a further modified form of nut is shown at 102 and consists of a threaded body 104 and flange 106, corresponding to the aforementioned body 96 and flange 98 on the nut 94. However, instead of providing prongs, three holes/fittings 108 are provided to allow engagement with a complementary tool usable to prevent turning as the associated bolt 56 is turned relative thereto.

Figure 12:
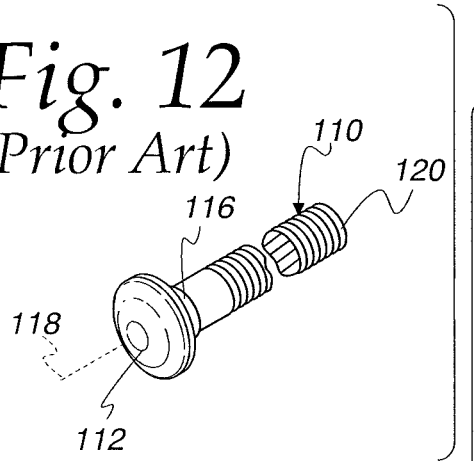
FIG. 12 is a fragmentary, perspective view of another form of conventional bolt into which the present invention can be incorporated.
Figure 13:
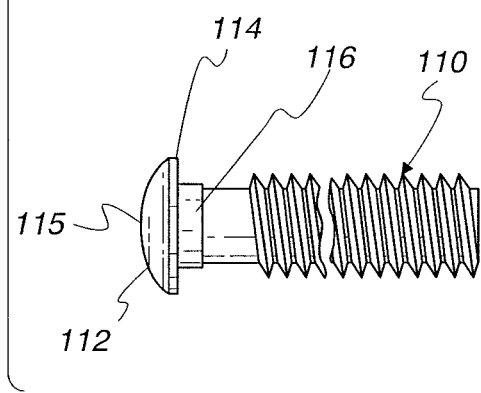
FIG. 13 is a fragmentary, side elevation view of the bolt in FIG. 12.

A further variation of bolt is shown at 110 in FIGS. 12 and 13. This bolt 110 is commonly referred to as a carriage bolt. The bolt 110 differs from the bolt 56 primarily in the configuration of the head 112. The head 112 has a smooth, annular circumferential surface 114 with a low axial profile so that it is not readily graspable to effect turning. An axially facing head surface 115 is convex. A neck region 116, projecting away from the head 114, has a polygonal shape which can be pressed into the respective object 12, 14 to make a keyed connection therewith to prevent turning of the bolt 110 around its axis 118 as a nut is tightened at the leading end 120.

Figure 14:
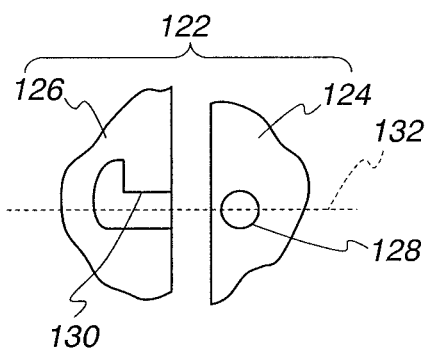
FIG. 14 is a fragmentary elevation of another form of conventional fastener, into which the present invention can be incorporated, and that makes a bayonet-type connection.

A further form of conventional fastener is shown in FIG. 14 at 122 with cooperating parts 124, 126 having cooperating components 128, 130 that are relatively turned to produce a conventional bayonet-type connection. This structure is shown since the parts 124, 126 can be used with corresponding objects 12, 14 to maintain a relationship therebetween by relatively turning the parts 124, 126 about an axis 132. The component 128 projects radially from the part 124 and moves into the component 130, which is in the form of a J-shaped slot. Relative axial movement between the parts 128, 130, followed by relative turning movement around the axis 132 effects fastening, as with a conventional threaded connection.

The foregoing prior art structures have been described as only examples of fastener types into which the present invention can be incorporated. The generic showing of FIG. 1 encompasses these specific forms and many others, which would be obvious to one skilled in the art with the teachings herein in hand.

Common to the fasteners shown in FIGS. 2-11 is the tightening thereof that involves either turning the fastener shank by manipulating a head thereon or holding the fastener shank against turning through the head as a separate nut is manipulated.

The inventive fastener 10, as shown in FIG. 1, has a body 134 with an elongate shank 136 with a central axis. The body 134 has a length extending in an axial direction between a leading end 138 and a trailing end 140.

A head 142 is provided at the trailing end 140 of the body 134 and has a blocking surface 144 thereon that faces generally axially in a leading direction.

The body 134 has at least one engagement part 146 on the shank 136. The engagement part 146 is configured to engage either one of the objects 12, 14 and/or at least one separate engagement part 148. For purposes of simplicity herein, the engagement part 148, whether defined by one of the objects 12, 14 or made up of a discrete, separate component used in conjunction therewith, will be considered to be a part of the fastener 10.

In one form, as opposed to turning the shank through the head 142, or holding the shank against turning through the head 142, the shank turning is effected at an engaging location 150 on the body, which location is spaced axially from the head 142.

One specific, exemplary form of the inventive fastener 10 is shown in FIGS. 16-20. The fastener 10 has a bolt part 152 with the aforementioned body 134 with a shank 136 and engagement parts 146, made up of individual turns on a threaded length of the shank 136.

The head 142 has a convex surface 144 and an oppositely facing blocking surface 154.

The engagement part 148 of the fastener 10 is in the form of a nut having a body 156 with a generally cylindrical body portion 158 having internal threads 160. A flange 162 projects radially outwardly from the body portion 158 in relationship to a central axis 164 shared by the shank 136 and nut 152 with the fastener parts 148, 152 engaged.

The flange 162 has axially oppositely facing surfaces 166, 168. The surface 168 is a blocking surface that faces the head surface 154 with the fastener parts 148, 152 connected as in FIG. 17. The opposite surface 168 is convex, corresponding generally to the convex surface 144 on the fastener head 142.

The engagement part 148 has a bore 170 that extends fully therethrough and on which the threads 160 are formed.

The body portion 158 has a plurality of flats 172 on a peripheral surface thereof to allow a keyed connection to be made with a respective object 12, 14.

In the embodiment shown, the objects 12, 14 are shown as arbitrary square pieces. As noted above, the objects 12, 14 may take any shape and may be small pieces or large assemblies. For purposes of simplicity, the square shapes are shown to demonstrate the basic function of the inventive fastener 10.

With the objects 12, 14 in a desired relationship (one on top of the other in FIG. 19), a bore 174 is formed continuously therethrough. The bolt part 152 of the fastener 10 can then be directed, leading end 138 first, thereinto with the head surface 154 facing the surface 50 of the object 12.

Figure 20:
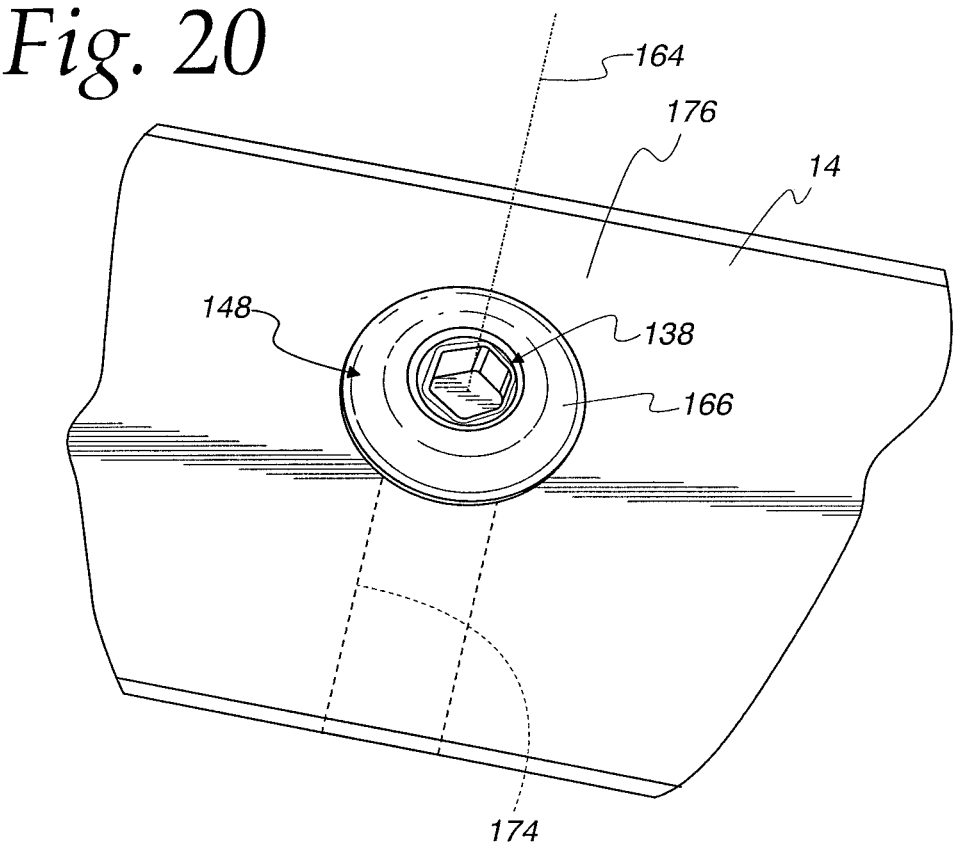
FIG. 20 is a bottom view of the assembly shown in FIG. 19.

Before the bolt part 152 of the fastener 10 is fully inserted, the body portion 158 of the engagement part 148 can be directed into the bore 174 through the surface 176 on the object 14, facing oppositely to the surface 50 on the object 12, as seen in FIG. 20. The bore 174 is dimensioned so that the body portion 158 must be forced thereinto, such that the flats 172 are in confronting relationship with surfaces on the object 14 around the bore 174, whereby the engagement part 148 is keyed against turning around the axis 164. The surface 166 on the body 156 of the engagement part 148 may be implanted as by being struck to effect seating thereof whereupon the flange surface 168 abuts to the surface 176 on the object 14.

The head 142 may then be grasped as between a user's fingers to turn the bolt part 152 to thereby make initial engagement between the thread turns 178 making up the engagement part 146 on the bolt part and the threads 160 on the engagement part 148.

Figure 18:
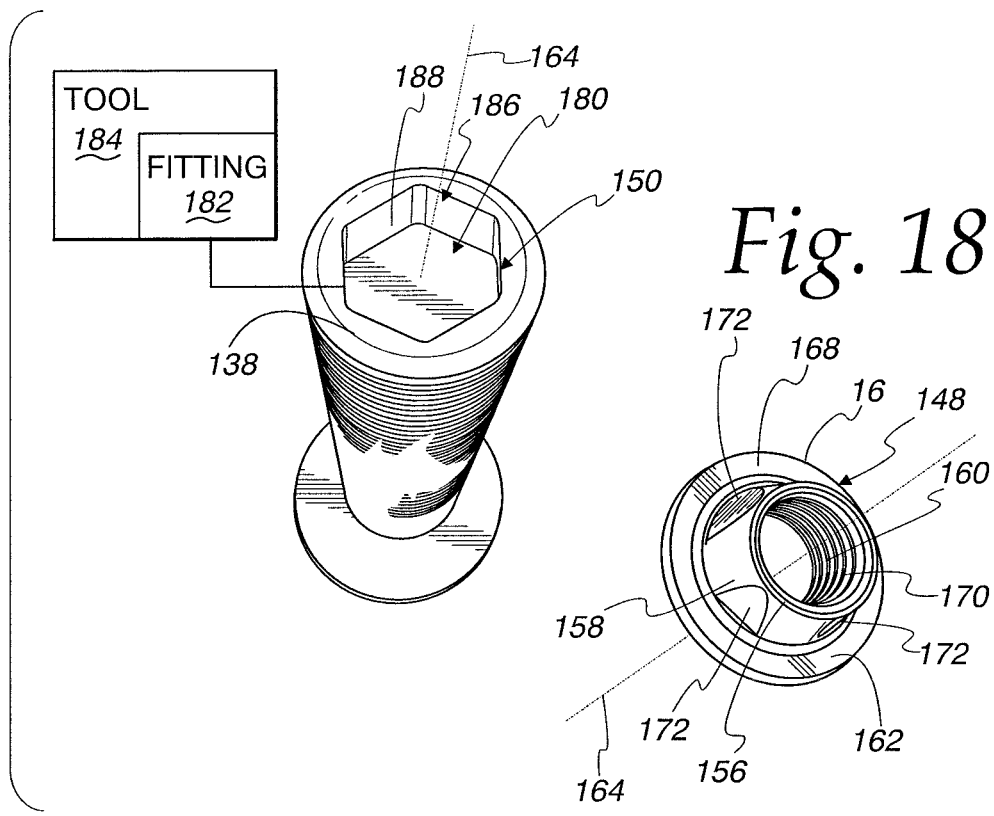
FIG. 18 is a perspective view of the nut and bolt in FIGS. 16 and 17, separated from each other and from a different perspective.
Figure 19:
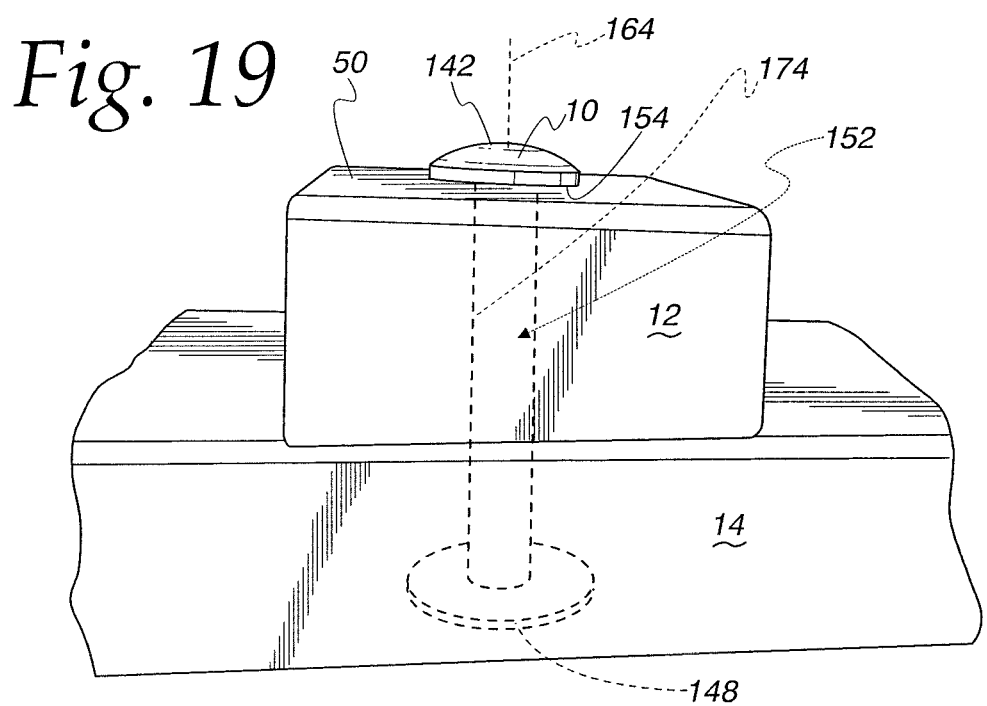
FIG. 19 is a perspective view of the nut and bolt in FIGS. 16-18 in a fastened state with respect to first and second objects.

In this embodiment, the leading end 138 of the body 134 has a tool fitting 180 thereon to be engaged by a complementary fitting 182 on a tool 184, as shown schematically in FIG. 18. As depicted, the fitting 182 is complementary to a conventional hex/Allen key. The tool fitting 180 is in the form of an axially extending cavity 186 that has a surrounding hex-shaped wall 188.

By directing the hex fitting 182 on the tool 184 axially into the bore 170 and the engagement part 148, the hex fitting 182 can make keyed connection within the cavity 186. By then turning the bolt through the tool 184 at this engaging location 150, the shank 136 can be turned around the axis 164 without directly engaging the head 142. Accordingly, no configuration is required on the head 142 that will allow it to be grasped or engaged by a tool. In this particular form, the convex shape of the head surface 144 avoids any sharp edges or corners that are prone to snagging a person's limbs or any external objects.

Figure 21:
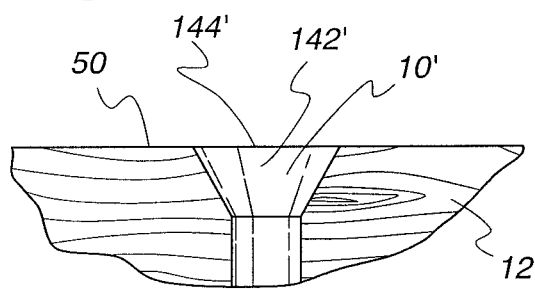
FIG. 21 is a fragmentary, side elevation view showing the connection between a head on a modified form of the inventive fastener and an object.

Since there is no requirement to engage the head other than possibly to facilitate initial engagement between the fastener 140 and engagement part 148, a modified form of fastener 10' and head 142' thereon, shown in FIG. 21, may be inset through the surface 50 of the object 12, whereby the head surface 144' can be flush therewith and have a smooth and uninterrupted shape over its entire exposed area. While some protrusion of the head surface 144' from the surface 50 is contemplated, the flush or near-flush arrangement is desired from the standpoint of aesthetics and also in that it minimizes the exposed periphery of the fastener 10' that might be engaged by someone using a tool. In any event, the surface 144' can be smooth and uninterrupted.

In the embodiment shown, the engagement part 148, usable as part of either fastener 10, 10', has a convex surface 166 similar to the shape of the head surface 144, with the exception of the bore 170 therethrough. This convex surface is selected for the same reason that the convex shape is selected for the head 142.

Figure 22:
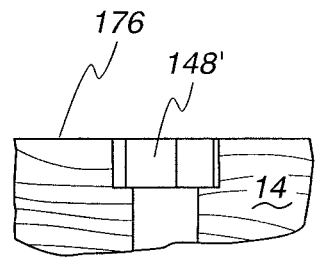
FIG. 22 is a fragmentary, cross-sectional view showing another form of nut, as usable with the inventive fastener in FIGS. 16-21, wherein the nut is recessed within its respective object.

As shown in FIG. 22, a corresponding engagement part 148' may be recessed within the object 14 so that it is flush with the object surface 176 through which it is directed into the FIG. 21 position. The depicted configuration is of a conventional hex nut.

As shown in FIG. 20, the fastener end 138 does not extend axially past the surface 166 on the engagement part 148 whereby it is not manipulable. However, the object 14 may be such that it is not exposed at the location at which the engagement part 148 is situated, whereby further axial extension of the body leading end 138 is not a concern and may facilitate turning of the body 134.

Any of the prior art nuts, described above, might be used with the bolt portion 152 of the fasteners 10, 10'.

Figure 23:
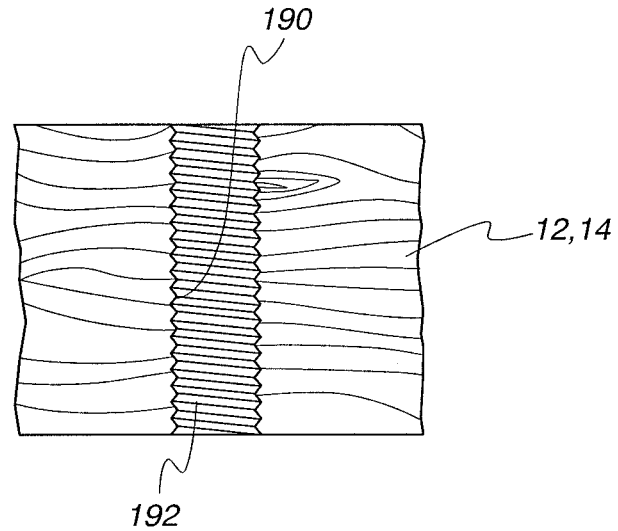
FIG. 23 is a fragmentary, cross-sectional view of an object with an engagement part formed by threads directly on the object.

As shown in FIG. 23, the invention also contemplates that one or both of the objects 12, 14 may have a preformed bore 190 with internal threads 192 that perform the function of the engagement part 148 and thus make up a part of the fastener 10. The invention otherwise is used in the same fashion to engage the body 134 at the engagement location 150 that is spaced from the head 142.

It should also be noted that the bayonet connection of FIG. 14 is, for purposes of simplicity herein, considered to be the same as a nut and bolt arrangement, with the fastener parts 124, 126 tightened by a combined translation and turning movement which is equivalent to a conventional threaded arrangement.

Figure 24:
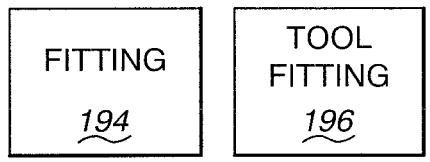
FIG. 24 is a schematic representation of a fitting on the inventive fastener and with complementary tool fitting for turning the fastener by engaging the fitting thereon.

While the hex arrangement is shown for the complementary fastener and tool fittings 180, 182, the invention contemplates that the fastener fitting 194, as shown in FIG. 24, may be any configuration that is engageable with a tool fitting 196, either of conventional construction or having a customized shape for purposes of security.

While some sort of axially extending receptacle is generally contemplated for the fitting 194, if the fastener 10 projects from the engagement part 148, another type of fitting might be designed. The invention also contemplates that the engaging location 150 may be similarly formed at the leading end 30 of a fastener 20 as shown in FIG. 2.

Figure 25:
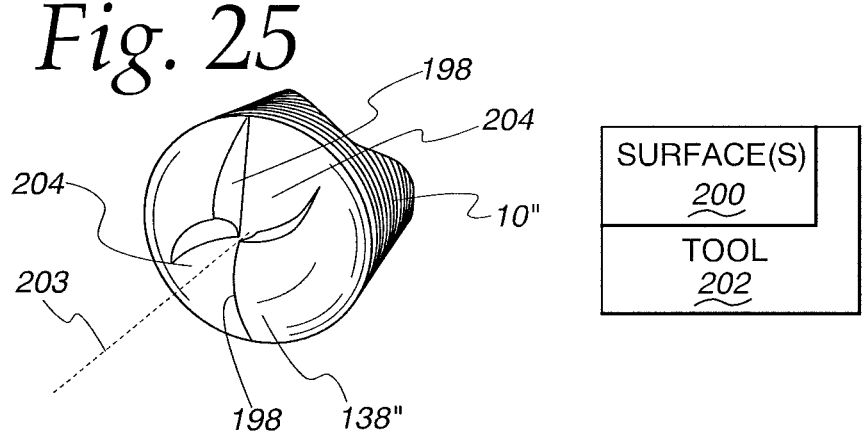
FIG. 25 is a fragmentary, perspective view showing a modified form of the leading end of a fastener, according to the present invention, which can be turned only in a tightening direction using a tool as shown schematically in FIG. 25.

As an additional security feature, as shown in FIG. 25, the leading end 138" of a fastener 10" may be provided with one or more circumferentially facing surfaces 198 that allow one or more surfaces 200 on a tool 202 to bear thereagainst with the tool surface 200 moving in one circumferential direction that causes the fastener 10″ to turn in a tightening direction around the fastener axis 203.

In the embodiment depicted, a slotted screwdriver can be used to engage diametrically opposite surfaces 198 that cooperatively bound a tool fitting receptacle. The engagement will be effected only in one direction of turning of the screwdriver. Opposite turning causes the blade to simply slide along diametrically opposite smooth, sloped surfaces 204.

Figure 26:
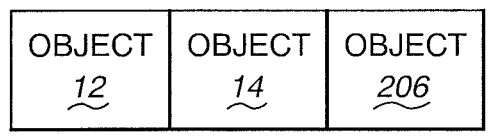
FIG. 26 is a schematic representation of multiple objects capable of being maintained in a desired relationship through the inventive fasteners.

As shown in FIG. 26, any number of objects, greater than two, might be secured using the inventive fasteners 10. As shown in FIG. 26, three such objects, 12, 14, 206 are aligned for engagement by the fastener 10.

Figure 27:
FIG. 27 is a flow diagram representation of a method of maintaining first and second objects in a desired relationship, according to the invention.

With the inventive structure, a method of maintaining first and second objects in a desired relation can be practiced, as shown in flow diagram form in FIG. 27.

As shown at block 208, a fastener is obtained having a body with an elongate shaft with a central axis and a length extending in an axial direction between a leading end and a trailing end of the body. The body has a head defining a blocking surface facing generally in a leading direction. The shank is configured to engage a surrounding bore surface on or associated with at least one of the first and second objects to cause the shank to advance axially in a tightening direction, with the head in a trailing direction, as an incident of the shank being turned around the central axis in one direction.

As shown at block 210, the fastener body is engaged at a location spaced from the head.

As shown at block 212, a force is imparted at the engaging location to turn the shank around the central axis in the one direction. As an incident of turning the shank around the central axis in the one direction, the shank is caused to draw the head so as to urge the blocking surface of the head towards a selected holding position relative to one of the first and second objects, wherein the fastener is in a fastened state.

It should be noted that a system might be configured so that the head region is effectively at a constant axial location on its respective object and that another object may be drawn towards the head, which is essentially an equivalent action. For purposes of simplicity, both forms are considered in the description and claims to involve a drawing of the head to effect fastening.

The foregoing disclosure of specific embodiments is intended to be illustrative of the broad concepts comprehended by the invention.

The invention claimed is:

1. A method of maintaining first and second objects in a desired relationship, the method comprising the steps of:
    obtaining a fastener having a body with an elongate shank with a central axis and a length extending in an axial direction between a leading end and a trailing end of the body,
    the body having a head defining a blocking surface facing generally in a leading direction,
    the shank configured to engage a surrounding bore surface on or associated with at least one of the first and second objects to cause the shank to advance axially in a tightening direction, with the head in a trailing direction, as an incident of the shank being turned around the central axis in one direction;
    engaging the fastener body at a location spaced from the head and at the engaging location imparting a force to turn the shank around the central axis in the one direction; and
    as an incident of turning the shank around the central axis in the one direction causing the shank to draw the head so as to urge the blocking surface on the head towards a selected holding position relative to one of the first and second objects wherein the fastener is in a fastened state.

2. The method of maintaining first and second objects in a desired relationship according to claim 1 wherein the bore surface is at least one of formed in or enlarged as an incident of the shank advancing axially in the tightening direction.

3. The method of maintaining first and second objects in a desired relationship according to claim 1 wherein the fastener comprises a discrete component on at least one of the first and second objects that defines the surrounding bore surface.

4. The method of maintaining first and second objects in a desired relationship according to claim 3 wherein the shank and surrounding bore surface are complementarily threaded.

5. The method of maintaining first and second objects in a desired relationship according to claim 3 wherein the discrete component has a blocking surface that faces generally oppositely to the blocking surface on the head, the blocking surfaces defining a capturing region therebetween that is variable by effecting relative movement between the shank and discrete component around the central axis.

6. The method of maintaining first and second objects in a desired relationship according to claim 1 wherein the head has a surface facing oppositely to the blocking surface and with the fastener in the fastened state, the oppositely facing surface on the head is substantially flush with a surface through which the fastener extends on one of the first and second objects.

7. The method of maintaining first and second objects in a desired relationship according to claim 6 wherein the oppositely facing surface is smooth and uninterrupted over an entire area of the oppositely facing surface.

8. The method of maintaining first and second objects in a desired relationship according to claim 1 wherein the leading end has a receptacle to make a keyed connection with a part of a turning tool through which the shank can be turned around the central axis.

9. The method of maintaining first and second objects in a desired relationship according to claim 8 in combination with a turning tool with a part to make the keyed connection with the leading end receptacle.

10. The method of maintaining first and second objects in a desired relationship according to claim 3 wherein with the first and second objects in an operative relationship the first and second objects respectively define oppositely facing first and second surfaces and with the fastener in the fastened state the head does not project significantly from the first surface and the discrete component does not project significantly from the second surface.

11. The method of maintaining first and second objects in a desired relationship according to claim 8 wherein the receptacle is defined by a surface that extends continuously around the central axis.

12. The method of maintaining first and second objects in a desired relationship according to claim 11 wherein the surface defines a polygonal shape as viewed along the central axis.

13. The method of maintaining first and second objects in a desired relationship according to claim 1 wherein the receptacle is bounded by a surface that faces circumferentially oppositely to the one direction.

14. The method of maintaining first and second objects in a desired relationship according to claim 1 wherein the first and second objects in the desired relationship are fixed relative to each other.

15. The method of maintaining first and second objects in a desired relationship according to claim 14 wherein the first and second objects are drawn towards each other as the fastener is changed into the fastened state.

16. The method of maintaining first and second objects in a desired relationship according to claim 15 wherein there is at least a third object between the first and second objects.

17. The fastener as recited in claim 1.

18. The fastener according to claim 17 wherein the leading end has a receptacle to make the keyed connection with a part of a turning tool through which the shank can be turned around the central axis.

19. The fastener according to claim 18 in combination with a turning tool with a part to make the keyed connection with the leading end receptacle.

20. The fastener according to claim 19 wherein the receptacle and part of the turning tool have a customized shape to preclude turning of the shank with a conventional tool.

* * * * *